(12) United States Patent
Raz et al.

(10) Patent No.: US 7,984,151 B1
(45) Date of Patent: Jul. 19, 2011

(54) DETERMINING PLACEMENT OF USER DATA TO OPTIMIZE RESOURCE UTILIZATION FOR DISTRIBUTED SYSTEMS

(75) Inventors: Danny Raz, Palo Alto, CA (US); Nareshkumar Rajkumar, San Jose, CA (US); Leeann Bent, Santa Clara, CA (US); Bradley Whitehead, Mountain View, CA (US); Douglas Zongker, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 248 days.

(21) Appl. No.: 12/248,863

(22) Filed: Oct. 9, 2008

(51) Int. Cl.
*G06F 15/173* (2006.01)

(52) U.S. Cl. .................... 709/226; 709/223; 709/225

(58) Field of Classification Search .................. 709/203, 709/217–219, 223, 225–226
See application file for complete search history.

(56) References Cited

U.S. PATENT DOCUMENTS

| | | | |
|---|---|---|---|
| 6,223,209 B1 * | 4/2001 | Watson ........................ | 709/201 |
| 6,779,119 B1 * | 8/2004 | Moshfeghi et al. .............. | 726/23 |
| 6,920,498 B1 * | 7/2005 | Gourlay et al. ............... | 709/227 |
| 7,020,698 B2 * | 3/2006 | Andrews et al. .............. | 709/223 |
| 7,167,965 B2 | 1/2007 | Alvarez et al. | |
| 7,181,527 B2 * | 2/2007 | Valenci et al. ................ | 709/234 |
| 7,200,658 B2 * | 4/2007 | Goeller et al. ................ | 709/224 |
| 7,209,941 B2 * | 4/2007 | Furusawa et al. ............. | 709/202 |
| 7,225,317 B1 | 5/2007 | Glade et al. | |
| 7,386,318 B2 * | 6/2008 | Moon et al. ................ | 455/456.3 |
| 7,388,839 B2 | 6/2008 | Chafle et al. | |
| 7,389,510 B2 | 6/2008 | Forrester | |
| 7,392,317 B2 | 6/2008 | Halpern | |
| 7,395,335 B2 | 7/2008 | Brown et al. | |
| 7,395,355 B2 | 7/2008 | Afergan et al. | |
| 7,395,388 B2 | 7/2008 | Sugiura et al. | |
| 7,587,500 B2 * | 9/2009 | Rozen .......................... | 709/229 |
| 7,653,700 B1 * | 1/2010 | Bahl et al. .................... | 709/217 |
| 7,711,821 B2 * | 5/2010 | Pendarakis et al. ........... | 709/226 |
| 2005/0262245 A1 * | 11/2005 | Menon et al. ................. | 709/226 |
| 2006/0126532 A1 * | 6/2006 | Binding et al. ............... | 370/254 |
| 2007/0198802 A1 * | 8/2007 | Kavuri .......................... | 711/170 |
| 2009/0043893 A1 * | 2/2009 | Pendarakis et al. ........... | 709/226 |
| 2009/0106393 A1 * | 4/2009 | Parr et al. ....................... | 709/218 |
| 2009/0210242 A1 * | 8/2009 | Black et al. ....................... | 705/1 |
| 2009/0235283 A1 * | 9/2009 | Kim et al. ...................... | 719/328 |
| 2010/0005182 A1 * | 1/2010 | Rozen .......................... | 709/229 |
| 2010/0125626 A1 * | 5/2010 | Lucas et al. ................... | 709/203 |

* cited by examiner

*Primary Examiner* — Faruk Hamza
(74) *Attorney, Agent, or Firm* — Brake Hughes Bellermann LLP (57) ABSTRACT

User information describing a group of users of a distributed computer system configured to store and retrieve individualized user data associated with individual ones of the group of users, and system resource information associated with the distributed computer system, may be obtained. A global distribution plan describing a distribution of at least a portion of the individualized user data associated with the group may be determined based on a global optimization function of the obtained user information and system resource information associated with the distributed computer system, wherein the global optimization function is based on optimizing a global distribution of the portion of the individualized user data based on a determination of a measure of performance and fault tolerance associated with a model of the distributed computer system configured in accordance with the global distribution plan. The determined global distribution plan may be provided to a device for processing.

22 Claims, 5 Drawing Sheets

310
Obtain user information describing a group of users of a distributed computer system configured to store and retrieve individualized user data associated with individual ones of the group of users 312 The user information includes aggregated user profile information describing at least one attribute associated with the group

| 314 The aggregated user profile information includes a count of the users included in the group | 315 The aggregated user profile information includes information describing a system resource usage attribute that indicates a usage attribute value that is similar for each user of the group | 316 The system resource usage attribute includes a measure of usage of a system resource of the distributed computer system by each user included in the group | 318 The system resource usage attribute includes a measure of an amount of individualized user data stored on a server of the distributed computer system that is similar for each user included in the group |

320
Obtain system resource information associated with the distributed computer system

330
Determine a global distribution plan describing a distribution of at least a portion of the individualized user data associated with the group of users based on a global optimization function of the obtained user information and system resource information associated with the distributed computer system, wherein the global optimization function is based on optimizing a global distribution of the at least a portion of the individualized user data based on a determination of a measure of performance and fault tolerance associated with a model of the distributed computer system configured in accordance with the global distribution plan

340
Provide the determined global distribution plan to a device for processing of the global distribution plan 342 Send the global distribution plan to a data center load balancer

DETERMINING PLACEMENT OF USER DATA TO OPTIMIZE RESOURCE UTILIZATION FOR DISTRIBUTED SYSTEMS

TECHNICAL FIELD

This description relates to determining placement of user data to optimize resource utilization for distributed systems, in particular, for very large distributed server systems. This description further relates to determining optimal placement of user data to reduce latency and network utilization for distributed systems.

BACKGROUND

Large distributed user data services may serve millions of clients. For example, email services, calendar services, and other types of user data services may store user-specific data for each of millions of users or clients on one or more distributed data servers. Each different user or client may engage in varying degrees of activity, and may access the system via various types of interfaces. Further, the size of each client's data may vary from one client to the next. For example, a first user may store several gigabytes of email data via an email server, while a second user may store only a few kilobytes or megabytes of email data via the same email server. As another example, several different users may store varying amounts of data such as personal photo files via the same server, or the different users may store varying amounts of data such as calendar information via the same server. The number of such users or clients may range from hundreds to thousands, millions, or billions of users. Additionally, the users or clients may dynamically store or delete their own user data, or may send messages to others, or may receive messages from others, resulting in more dynamic activity.

Placement of a user's individualized data, including backup copies of the individualized data, may have an impact on system performance, for example, in terms of latency of serving data to users, efficiency of service network utilization, and redundancy of the system in terms of resilience to failures. As another example, a user may be associated with a particular geographic region, in terms of network connection, with which the client may be physically located most of the time. For example, the client may be associated with Europe, the eastern coast of the United States, etc. For example, if the client is physically located in Peoria, Ill. (i.e., in the midwestern part of the United States), then the system may suffer network latency issues if the client's data is physically stored on one or more servers in Australia or India.

In addition, users may have a provider agreement or contract such as a service level agreement that may include provisions for preferred (e.g., gold) clients or that may include legal provisions such as "data must be kept in United States." For example, a European client may prefer a service agreement providing that the client's "data must be kept out of the United States" in order to avoid potential issues involving the Patriot Act.

SUMMARY

In a first general aspect, a computer-implemented method includes obtaining user information describing a group of users of a distributed computer system configured to store and retrieve individualized user data associated with individual ones of the group of users. System resource information associated with the distributed computer system may be obtained. A global distribution plan describing a distribution of at least a portion of the individualized user data associated with the group of users may be determined based on a global optimization function of the obtained user information and system resource information associated with the distributed computer system, wherein the global optimization function is based on optimizing a global distribution of the at least a portion of the individualized user data based on a determination of a measure of performance and fault tolerance associated with a model of the distributed computer system configured in accordance with the global distribution plan. The determined global distribution plan may be provided to a device for processing of the global distribution plan.

In another general aspect, a computer-implemented method includes obtaining user information describing a group of users of one or more data servers associated with a distributed computer system configured to store and retrieve individualized user data associated with individual ones of the group of users. The obtained user information may be sent, and a global distribution plan may be received. The global distribution plan describes a distribution of at least a portion of the individualized user data associated with the group of users based on a global optimization function of the obtained user information and system resource information associated with the distributed computer system, wherein the global optimization function is based on optimizing a global distribution of the portion of the individualized user data based on a determination of a measure of performance and fault tolerance associated with a model of the distributed computer system configured in accordance with the global distribution plan. A distribution of the at least a portion of the individualized user data associated with the group may be initiated based on the global distribution plan.

In another general aspect, a system includes an instruction store configured to store machine-executable instructions and an instruction processor configured to execute at least a portion of the machine-executable instructions stored in the instruction store. The system may include a global load balancer including a global execution engine configured to obtain user information describing a group of users of a distributed computer system configured to store and retrieve individualized user data associated with individual ones of the group of users and to obtain system resource information associated with the distributed computer system. The global load balancer includes a global optimization engine configured to determine a global distribution plan describing a distribution of at least a portion of the individualized user data associated with the group of users based on a global optimization function of the obtained user information and system resource information associated with the distributed computer system, wherein the global optimization function is based on optimizing a global distribution of the at least a portion of the individualized user data based on a determination of a measure of performance and fault tolerance associated with a model of the distributed computer system configured in accordance with the global distribution plan, and to provide the determined global distribution plan to a device for processing of the global distribution plan.

In another general aspect, a system includes an instruction store configured to store machine-executable instructions and an instruction processor configured to execute at least a portion of the machine-executable instructions stored in the instruction store. The system includes a data center load balancer including a data center information collector configured to obtain user information describing a group of users of one or more data servers associated with a distributed computer system configured to store and retrieve individualized user data associated with individual ones of the group of users, and send the obtained user information. The data center load balancer includes a data center plan distributor configured to receive a global distribution plan describing a distribution of at least a portion of the individualized user data associated with the group of users based on a global optimization function of the obtained user information and system resource information associated with the distributed computer system, wherein the global optimization function is based on optimizing a global distribution of the portion of the individualized user data based on a determination of a measure of performance and fault tolerance associated with a model of the distributed computer system configured in accordance with the global distribution plan, and to initiate a distribution of the at least a portion of the individualized user data associated with the group based on the global distribution plan.

The details of one or more implementations are set forth in the accompanying drawings and the description below. Other features will be apparent from the description and drawings, and from the claims.

BRIEF DESCRIPTION OF THE DRAWINGS

FIG. 3 is an example flow chart of a process for determining distribution plans.

DETAILED DESCRIPTION

User-centric systems such as large email systems, social networking systems, systems supporting user calendar activities, and systems supporting user data storage such as digital photo sharing sites may include large distributed data services with millions, or billions, of users. Each user of many of these systems may be characterized by various characteristics or attributes such as its activity, for example, with regard to a size of its data, a type of the interface it uses to access the system, etc. As used herein a "user" can be an individual person, a group of people (e.g., an organization) that share a computing resource, such as a family that shares a personal computer or employees of a small business that share a server computer, or a computing resource, such as a personal computer or a cluster of computers. The data of each user (e.g., individualized data) may be stored in one or more distributed data servers. Because the users, and the devices or servers included in the systems may be located in many different geographic areas within countries, or across the globe, the placement of this data among the different data servers, including any backup copies of the data, may have an impact on the latency with which the data is served to the user, the efficiency of service network utilization, and the redundancy of the system in terms of resilience to failures.

Thus, example techniques are provided herein relating to optimization of placement or distribution of data and/or backup data of each user, in order to, at least, minimize user latency and network resource utilization and maintain the ability of data servers associated with a distributed system to serve their users in an acceptable rate. One skilled in the art of data processing may appreciate that "minimization," "maximization," or "optimization" as referenced herein, may refer to techniques that provide results that may not be absolute minimums, maximums, or optimums. For example, an optimization routine can be terminated early once an acceptable solution or other acceptable termination point is reached, and may still fall within the spirit of the present discussion.

In one example implementation, the individualized user data associated with many users may already be present in the distributed data system, and thus example distribution techniques may determine a data migration plan that may indicate which data (i.e., the data of which user) to move from particular servers of the system and one or more proposed destinations for the data. In one example implementation, the plan may be based on such considerations as an optimal placement of the data as well as the cost (e.g., in terms of utilizing system resources) of the data migration itself.

Figure 1:
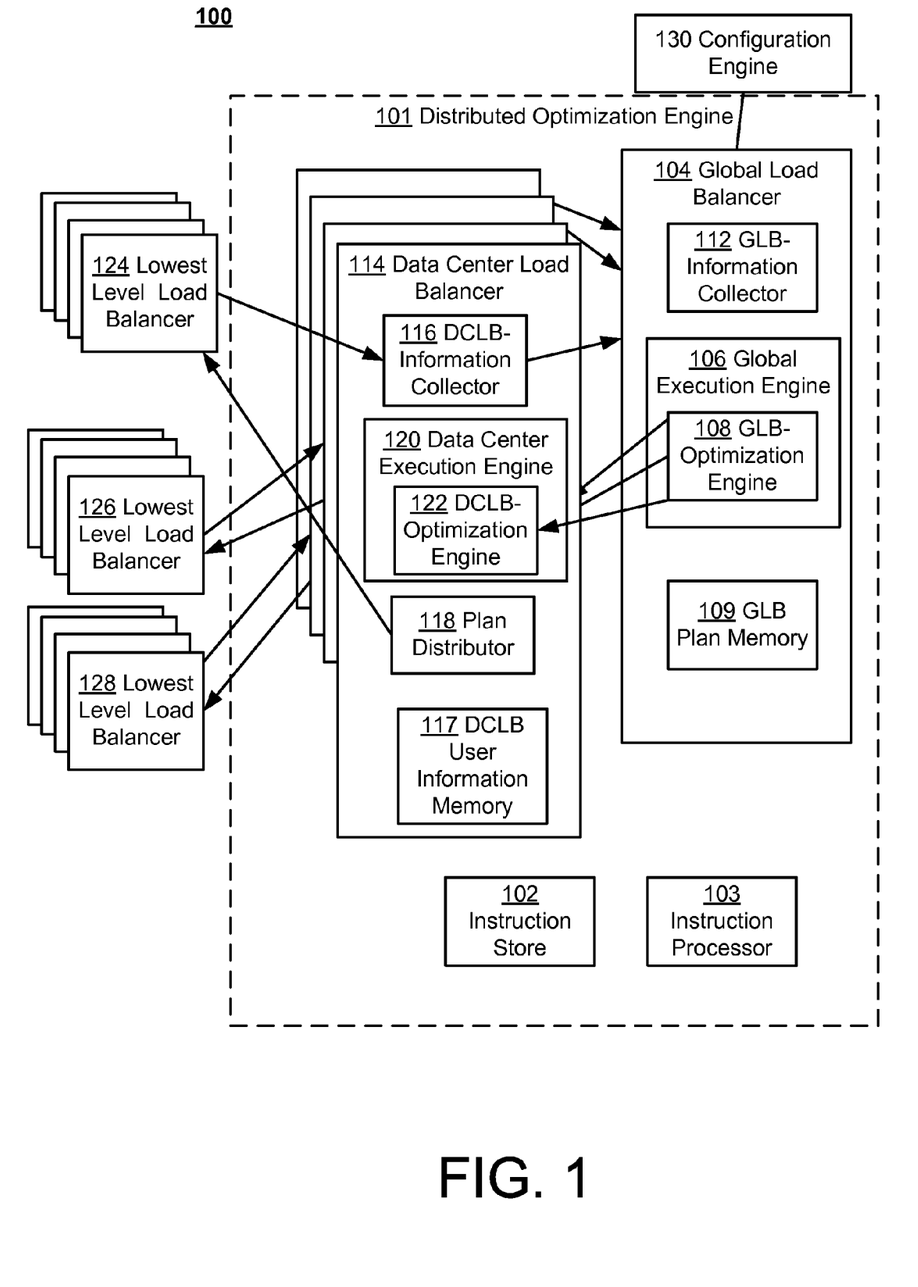
FIG. 1 is a block diagram of an example user data load balancing system.

Referring to FIG. 1, an example block diagram of an example user data load balancing system 100 is illustrated. In one example implementation, the system 100 may service a distributed system that provides individualized user data services to users. In one example implementation, the system 100 may include a distributed optimization engine 101 that may include one or more instruction stores 102 for storing machine-executable instructions configured to cause one or more machines or devices to perform example techniques as discussed herein. The instruction store 102 may include a memory or machine-readable storage medium, as discussed further below. The distributed optimization engine 101 may include one or more instruction processors 103 for executing instructions, for example, for executing instructions stored in the instruction store 102, such as the machine-executable instructions, as discussed further below.

The distributed optimization engine 101 may include a global load balancer 104 configured to determine distribution plans describing distributions of individualized user data associated with users of a distributed computer system. For example, the distributed computer system may support email operations for the users, calendar operations for the users, digital photo storage and processing for the users, or any other type of operations involved in storage and processing of individualized user data in a distributed computer system.

In one example implementation, the global load balancer 104 may include a global execution engine 106. The global execution engine 106 may be configured to obtain user information describing a group of users of a distributed computer system configured to store and retrieve individualized user data associated with individual ones of the group of users and to obtain system resource information associated with the distributed computer system.

The information may include aggregated information such as summary statistics associated with the usage of system resources, based on summaries generated by devices handling activities and system resource needs of individual users of the distributed computer system. For example, the aggregated information may include one or more counts of groups of users who store individualized user data in various ranges of storage (e.g., 0-500 kilobytes for a first range, 500 kilobytes-5 Megabytes for a second range, etc.). Such information generally describes usage of a system resource associated with a group of users of a distributed computer system, where the computer system is configured to store and serve individualized user data associated with individual users in the group. The global load balancer 104 may include a global optimization engine 108 configured to determine a global distribution plan describing a distribution of at least a portion of the individualized user data associated with the group of users based on a global optimization function of the obtained user information and system resource information associated with the distributed computer system, wherein the global optimization function is based on optimizing a global distribution of the at least a portion of the individualized user data based on a determination of a measure of performance and fault tolerance associated with a model of the distributed computer system configured in accordance with the global distribution plan, and to provide the determined global distribution plan to a device for processing of the global distribution plan.

In one example implementation, the global optimization engine 108 may be configured to provide the determined global distribution plan to a device based on sending the global distribution plan to a data center load balancer. In one example implementation, after the global distribution plan is generated by the optimization engine 108, it can be stored in a global load balancer plan memory 109 that is configured to store distribution plans.

In one example implementation, the user information may include aggregated user profile information describing at least one attribute associated with the group. In one example implementation, the aggregated user profile information may include a count of the users included in the group.

In one example implementation, the aggregated user profile information may include information describing at least one system resource usage attribute having a similar value for each user of the group. For example, a first group of users may be associated with respective individualized user data substantially occupying 5 megabytes of storage, while a second group of users may be associated with respective individualized user data substantially occupying only 500 kilobytes of storage or less. Thus, the aggregated user profile information for the first group would indicate that the members of the group use more storage space for their data than users of the second group. As another example, one group of users may consistently request access to their respective individualized user data from substantially the same geographic area (e.g., from the state of New York), while another group of users often may request access to their respective individualized user data from different geographic areas (e.g., a frequent business traveler in this group may request access to his individualized user data from the state of New York on Monday, from Paris, France on Tuesday, from Sydney, Australia on Thursday, and from the state of California on Saturday, etc.).

In one example implementation, the global optimization engine 108 may be configured to determine the global distribution plan based on executing a constraint optimization operation on the obtained user information and system resource information associated with the distributed computer system, to generate the global distribution plan. In one example implementation, the constraint optimization operation may be based on linear programming.

In one example implementation, the global load balancer 104 may include a global information collector 112 configured to obtain data center information that includes information associated with a specific data center. The global information collector 112 may be configured to determine an aggregated representation of the data center information based on at least one measure associated with the data center information. For example, the global information collector 112 may aggregate user profile information obtained from one or more data center load balancers 114 based on similarities of distributed system resource usage among users. For example, the global information collector 112 may aggregate user profile information obtained from one or more data centers based on similarities of individualized data storage usage among users. For example, the global information collector 112 may aggregate user profile information obtained from one or more data center load balancers 114 based on similarities of network bandwidth usage or processor usage among users.

For example, if there are 10 sets of users of a system, and 5 of these sets of users have very high bandwidth usage while the other 5 sets of users have very low bandwidth usage, then the global information collector 112 may analyze this information and determine that the first 5 sets of users should be included in a first group and the second 5 sets of users should be included in a second group. For example, the sets of users may be determined at a lower level of the distributed optimization engine 101, as discussed further below. The aggregated representation may include a summary of information regarding users or resources, so that, for example, users may be grouped into groups or classes for statistical purposes, instead of considering attributes of each user individually. Thus, the aggregated information may, for example, include counts of users having attributes that have similar, or substantially the same values. Using this aggregated information, the global load balancer 104 may receive information regarding the attributes with respect to counts of numerous users, instead of receiving information regarding each individual user. Transmission of the aggregated information and processing thereof may thus be greatly simplified.

In one example implementation, the system resource usage attribute may include a measure of usage of at least one system resource of the distributed computer system by each user included in the group. In another example implementation, the system resource usage attribute may include a measure of an amount of individualized user data stored on at least one server of the distributed computer system for each user included in the group.

In an example implementation, the system 100 may include a data center load balancer 114, which may include a data center information collector 116 configured to obtain user information describing a group of users of one or more data servers associated with a distributed computer system configured to store and retrieve individualized user data associated with individual ones of the group of users, and send the obtained user information. In an example implementation, the data center information collector 116 may be configured to aggregate user profile information describing at least one attribute associated with the group for a data center that includes the one or more data servers. The data center information collector 116 may store the user information in a user information memory 117 that is configured to store user information.

In one example implementation, the data center load balancer 114 may include a data center plan distributor 118 configured to receive a global distribution plan describing a distribution of at least a portion of the individualized user data associated with the group of users based on a global optimization function of the obtained user information and system resource information associated with the distributed computer system, wherein the global optimization function is based on optimizing a global distribution of the portion of the individualized user data based on a determination of a measure of performance and fault tolerance associated with a model of the distributed computer system configured in accordance with the global distribution plan. The data center load balancer 114 may initiate a distribution of the at least a portion of the individualized user data associated with the group based on the global distribution plan.

In one example implementation, the data center load balancer 114 may include a data center execution engine 120 configured to receive at least one global distribution plan. The engine 120 may determine a data center partial distribution plan that describes a distribution of at least a portion of the individualized user data based on an optimization function of aggregated user profile information and based on system resource information associated with the distributed computer system.

In one example implementation, the data center execution engine 120 may include a data center optimization engine 122 configured to initiate execution of a linear programming application that is configured to provide the data center partial distribution plan.

In one example implementation, the data center plan distributor 118 may be configured to send the data center partial distribution plan to a global load balancer.

In one example implementation, the data center load balancer 114 may be associated with a data center that may include a lowest level load balancer 124 that may be configured to obtain user information associated with users that may be associated with data servers associated with the lowest level load balancer 124. As shown in FIG. 1, other data center load balancers similarly may be included in the distributed optimization engine 101, and similarly may be associated with lowest level load balancers such as lowest level load balancers 126, 128.

For example, one or more data servers may be included in the lowest level load balancers. A server rack may include a group of machines or devices that are part of the same subnet (e.g., within a data center). For example, the data center may house or include a group of devices such as one or more racks of computing devices, which may be accessed by one or more servers.

In this context, a bucket may include aggregated user profiles, where the aggregated profiles may include statistics associated with users of the distributed system. The aggregated user statistics may be obtained by load balancers at relatively lower levels of a load balancer hierarchy (e.g., lowest level load balancers, data center load balancers) and passed to load balancers at relatively higher levels in the hierarchy (e.g., from a lowest level to a data center level, or from a data center level to a global level). One skilled in the art of data processing will appreciate that there may be any number of levels of load balancers.

In this context, a distribution plan may include information associated with a distribution or move of data, e.g., a blueprint or instructions for the distribution or migration of data among the different data centers or racks of computers in the system 100. Thus, a distribution plan may include information associated with a distribution or move of individualized user data, such as information associated with a distribution or move of individualized user data between servers, or between data centers.

Further, the system 100 may include one or more configuration engines 130 that may provide configuration information associated with the distributed system to the global load balancer 104. For example, external input describing resource availability (e.g., information that may change due to various reasons, e.g., networking problems, data center failures, etc.) and the current policies regarding optimization criteria and cost of data moves may be provided to the global load balancer 104 by the configuration engine 130.

The one or more configuration engines 130 may be configured to provide configuration information including one or more of the following items of information: a list of data centers with their available capacity; information regarding network delay in between any pair of data centers; a list of user locations and the delay between any location and any data center; a bound on the amount of data that may be transferred out from or into any data center; a master-backup policy indicating which data centers may include a backup copy for each possible master copy (e.g., represented as a numeric value for each pair of data centers); a parameter indicating an importance of a master-backup independence with respect to user latency (e.g., for use in an optimization computation); a number of allowed moves per predetermined period; a policy regarding the maximum expected load in a data center (e.g., a maximal portion of a file system capacity that may be used, that may be considered as operational), which may be regarded as a high global watermark; and a target capacity of each data center.

In one example implementation, the user profile information may include information associated with each user's characteristics based on one or more of the following aspects: the user's activity characterizations, e.g., the size of the user's data, the activity pattern, the type of interface the user may use to access the service associated with the distributed computer system (e.g., Internet Message Access Protocol (IMAP) client); an agreement characterization, e.g., the type of contract the user has (e.g., a Service Level Agreement (SLA) Service Level Objective (SLO)), which may include being a preferred (gold) client or having other legal restriction such as "data must be kept in United States"; and a geographical characterization that describes the actual geographic region (e.g., in terms of a network connection to the user) with which the user may be associated (e.g., Europe, Eastern United States, etc.).

In one example implementation, the number of copies of each user's data and the placement of the various copies may impact the distributed system's resilience and performance parameters. For example, a user may be associated with a master copy and a backup copy of the user's individualized data, to assure a backup copy of the data exists. In such a situation, the user profile information may include information associated, with each user's characteristics based on a data placement characterization, which may refer to the actual placement of the user's data, the number of copies of the main data and various backup mechanisms.

In one example implementation, one or more attributes of users may be determined based on a group of users, with each group having one or more substantially similar, or common characterizations (e.g., user activity, user agreement, geographic locations of users), and locations of the users' individualized data, and information regarding the structure of the distributed computer system (e.g., capacity of different data servers, latency between different network locations, etc.). For example, an attribute value associated with a user's latency may include a measure of an expected latency of a specific user associated with a specific type of usage of a service of the distributed computer system. As another example, an attribute value associated with a data resilience of a user may include a measure of a risk that a particular user may be affected by network/servers failures.

As another example, an attribute value associated with network utilization may include a value indicating an amount of bandwidth used per each network link associated with the distributed system. As yet another example, an attribute value associated with a data server's utilization may include a value indicating an amount of load on each data server associated with the distributed system.

In one example implementation, two users with substantially the same characterizations and substantially the same data placement may experience substantially the same latency and data resilience, such that the two users may be viewed as substantially similar, from an optimization point of view. Thus, in one example implementation, the attribute values may be determined based on determining a number or count of users of each type (e.g., the users may be computationally grouped into "equivalence classes" with respect to attributes such as delay and system resource utilization). In one example implementation, optimization techniques, such as linear programming techniques, may be used to determine storage locations for each group of users such that an average latency of a user may be minimized, while a desired level of load balancing among various data servers may also be maintained.

For example, if a distributed system has millions of users, the example aggregation techniques may provide thousands of counters (e.g., a substantial reduction from the number of users) representing a current state of the distributed system such that example attribute values (e.g., user latency and data resilience, network utilization, and data server utilization) may be reasonably computed. As discussed above, in one example implementation, the example system 100 may determine a placement of the individualized user data of each user, e.g., the example system 100 may determine which user's data to re-place and where to move it.

In an example implementation, linear programming techniques may be provided to process the aggregated data discussed above, to compute an optimal data re-placement plan. One skilled in the art of data processing may appreciate that other optimization techniques may also be used, without departing from the spirit of the present discussion. These example techniques may be applied to scalable bucketed data, so that a solution may be determined in reasonable time. In an example implementation, several optimization criteria may be considered, and thus, the example system 100 may be configured according to decisions (e.g., by a manager or designer) regarding what will be optimized and what will be selected as optimization constraints. Based on these decisions, the example techniques discussed herein may provide optimal placements of individualized user data such that both user latency and resource utilization may be minimized.

In an example implementation, the system 100 may collect user and placement characterization information from data servers using the example structure discussed above. As discussed above, the information (e.g., the user profile information) may be aggregated at the data center level and sent to the global optimizer (e.g., the global load balancer 104). In an example implementation, the global load balancer 104 may also receive external input describing resource availability (e.g., information that may change due to various reasons, e.g., networking problems, data center failures, etc.) and the current policies regarding the optimality criteria and cost of data moves (e.g., from the configuration engine 130).

In an example implementation, based on this input, an optimal placement may be determined that may then be translated into a data migration plan that may be fed into an executer that moves the individualized user data from server to server based on the data migration plan. In an example implementation, this move may be reflected in a current state of the system, and a new plan that may be generated may already have feedback associated with the move. Thus, the system 100 may include a reactive system that may adjust itself dynamically to a "best" placement according to a current condition and policies of the distributed system.

Figure 2:
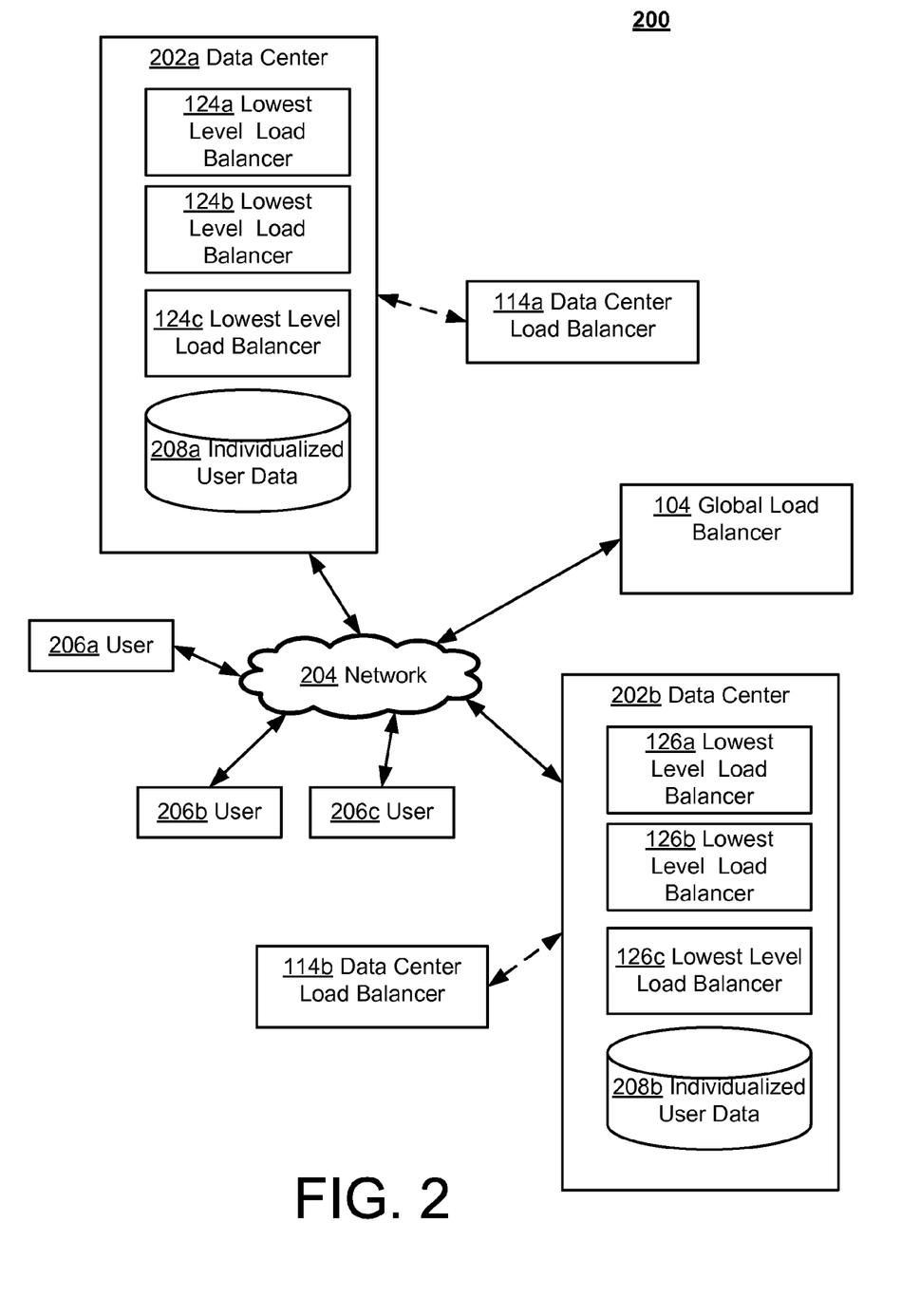
FIG. 2 is a block diagram of an example user data load balancing system.

Referring to FIG. 2, a block diagram of an example user data load balancing system 200 is illustrated. In one example implementation, and similar to the system 100 discussed above with regard to FIG. 1, the system 200 may service a distributed system that may include example data centers 202a, 202b communicating via a network 204, and which may provide individualized user data services to users, for example, users 206a, 206b, 206c. In one example implementation, the system 200 may include the global load balancer 104 (as discussed above) configured to determine distribution plans describing distributions of individualized user data associated with users of a distributed computer system. For example, the distributed computer system may support email operations for the users, calendar operations for the users, digital photo storage and processing for the users, or any other type of operations involved in storage and processing of individualized user data in a distributed computer system.

The data center load balancers 114a, 114b are shown in FIG. 2 as separated from their respective data centers 202a, 202b. However, the data center load balancers 114a, 114b may be implemented on the same device as the global load balancer 104, or may be implemented locally to the global load balancer 104, or may be implemented locally to their respective data centers 202a, 202b. One skilled in the art of data processing will appreciate that there may be many such implementation schemes for the data center load balancers 114a, 114b, without departing from the spirit of the discussion herein.

The network 204 may include any type of wired and/or wireless communication network such as, for example, the Internet, a cellular network, a messaging network, or any other type of communication network. The users 206a, 206b, 206c may also communicate with the distributed system directly or via the network 204 for example, via a computer, a cellular phone, a mobile computing device, a personal digital assistant (PDA) or other computing and/or phone or other communication type device. One skilled in the art of data processing will appreciate that there may be many different possible geographic locations for the data centers 202a, 202b, and for the users 206a, 206b, 206c. For example, the data center 202a may physically reside in Menlo Park, Calif., while the data center 202b may physically reside in London. For example, the user 206a may currently be located in Washington, D.C., the user 206b may be located in Perth, Australia, and the user 206c may be located in Beijing. For example, the global load balancer 104 may physically reside in Los Alamos, N. Mex.

The data centers 202a, 202b may include one or more respective storage areas for individualized user data 208a, 208b. For example, the storage areas 208a, 208b may include any type of storage medium suitable for storing individualized user data (e.g., hard disk, cache memory, etc.).

In one example implementation, the data center information collector 116, as discussed above with regard to FIG. 1, may be configured to obtain user profile information associated with each of a group of users based on user statistics sent to the data center information collector 116 by one or more of the lowest level load balancers 124a, 124b, 124c which may be located locally to the data center 202a.

For example, the global information collector 112, as discussed above with regard to FIG. 1, may aggregate user profile information obtained from one or more of the data centers 202a, 202b based on similarities of distributed system resource usage among users. For example, the global information collector 112 may aggregate user profile information obtained from one or more of the data centers 202a, 202b based on similarities of individualized data storage usage among users. For example, the global information collector 112 may aggregate user profile information obtained from one or more data centers 202a, 202b based on similarities of network bandwidth usage or processor usage among users.

In one example implementation, the system resource usage attribute may include a measure of usage of at least one system resource of the distributed computer system by each user included in the group.

In one example implementation, the system resource usage attribute may include a measure of an amount of individualized user data stored on at least one server of the distributed computer system that is similar for each user included in the group.

Thus, the data center load balancer 114a, 114b may include a load balancing entity configured to balance between all lowest level load balancers 124a, 124b, 124c or 126a, 126b, 126c respectively, in the data centers 202a, 202b, respectively.

In one example implementation, the respective lowest level load balancers 124a, 124b, 124c, 126a, 126b, 126c may be configured to obtain user profile information associated with each of a group of users of the distributed computer system that may be associated with entities associated with each of the respective lowest level load balancers 124a, 124b, 124c, 126a, 126b, 126c.

Many systems providing services to users involving individualized user data have experienced substantial growth in user populations in recent years. For example, systems providing email services (e.g., Microsoft's Hotmail, Google's Gmail, or Yahoo!'s Yahoo! Mail), systems providing calendar services (e.g., Google Calendar, Bravenet Calendar), social networking systems (e.g., Google's Orkut, MySpace), productivity software for individualized use (e.g., Google Docs, online based word processors, and spreadsheets, presentation applications), or storage of individualized user data such as digital images (e.g., Google's Picasa, Kodak's Gallery, YouTube), have grown substantially. Because of these increases by individual users associated with their individualized data, conventional load balancers may not provide optimal distributions in many cases.

For example, a general load balancer may receive a sampling of user identifiers from a user data manager. Such an example sampling may provide suboptimal results for scheduling moves, as a move scheduler may not be able to determine whether a user associated with a particular user identifier is an active user, when the received user identifier indicates that the user's data is 5-10 megabytes (MB) in size. Additionally, conventional load balancers may not distinguish between local load balancing (e.g., making a load uniform across tasks within a lowest level entity, which may be accomplished in a local data center) and global load balancing (e.g., moving users and their individualized user data due to adding and removing machines, or due to changes in system capacity, which may better be determined at a higher level in a system than in an individual data center), and may thus involve very complex operations.

Other features and functionalities of the components illustrated in FIG. 1 and FIG. 2 are described in more detail below with respect to FIGS. 3-5.

Referring to FIG. 3, a process 300 for determining a distribution plan is illustrated. Process 300 may include obtaining user information describing a group of users of a distributed computer system configured to store and retrieve individualized user data associated with individual ones of the group of users (310). For example, the global execution engine 106 may obtain user information describing a group of users of a distributed computer system configured to store and retrieve individualized user data associated with individual ones of the group of users (310).

In one example implementation, the user information may include aggregated user profile information describing at least one attribute associated with the group (312). In one example implementation, the aggregated user profile information may include a count of the users included in the group (314). In one example implementation, the aggregated user profile information may include information describing at least one system resource usage attribute that indicates a usage attribute value that is similar for each user of the group (315). In one example implementation, the system resource usage attribute may include a measure of usage of a system resource of the distributed computer system by each user included in the group (316). In one example implementation, the system resource usage attribute may include a measure of an amount of individualized user data stored on a server of the distributed computer system for each user included in the group (318).

In one example implementation, the system resource usage attribute may include an indicator of a similar geographic area associated with usage of system resources of the distributed computer system associated with the users included in the group. For example, the indicator of a similar geographic area may indicate a geographic area of the eastern part of the United States as being associated with the group of users, thus indicating a proximity of use for the users of the group. Thus, for example, the individualized user data for the group may be distributed to data centers in the eastern part of the United States in order to avoid greater network latency for access to the individualized user data by users included in the group.

In one example implementation, the distributed computer system may include a master copy of individualized user data stored on a first server and a backup copy of the individualized user data stored on a second server associated with each of the users included in the group. For example, if the first server is unable to serve the individualized user data included in the master copy, the user may be able to access the individualized user data included in the backup copy via the second server. Thus, it may be desirable to determine moves of both the master copy and the backup copy in a distribution plan. Further, it may be desirable for the master copy may to be located at a data center that is different from the data center associated with the backup copy.

System resource information associated with the distributed computer system may be obtained (320). In one example implementation, the system resource information may include information indicating at least one of processor capacity, processor usage, storage device capacity, storage device usage, geographic location of distributed network devices, network bandwidth, or network latency.

A global distribution plan describing a distribution of at least a portion of the individualized user data associated with the group of users may be determined based on a global optimization function of the obtained user information and system resource information associated with the distributed computer system, wherein the global optimization function is based on optimizing a global distribution of the portion of the individualized user data based on a determination of a measure of performance and fault tolerance associated with a model of the distributed computer system configured in accordance with the global distribution plan (330). For example, the global execution engine 106 may determine the global distribution plan based on executing a constraint optimization operation on the obtained user information and system resource information associated with the distributed computer system, to generate the global distribution plan. For example, the constraint optimization operation may be based on linear programming.

In one example implementation, the determined global distribution plan may be stored in a memory of a device, for example, in the global load balancer plan memory 109 discussed above.

The determined global distribution plan may be provided to a device for processing of the global distribution plan (340). In one example implementation, the global distribution plan may be sent to a data center load balancer (342). For example, the global execution engine 106 may send the determined global distribution plan to the data center execution engine 120.

In an example implementation, the system resource information may include an indication of a current distribution of users of the distributed computer system and a cost associated with a movement of data. In an example implementation, determining the global distribution plan may include determining a global move plan indicating a plan of movement of individualized user data associated with selected users between different locations in accordance with the optimal global distribution plan, as discussed further below.

In an example implementation, the user information may include aggregated user profile information describing at least one attribute associated with the group, and the global move plan may include aggregated user profile information and one or more counts associated with users selected for movement of data.

Figure 4:
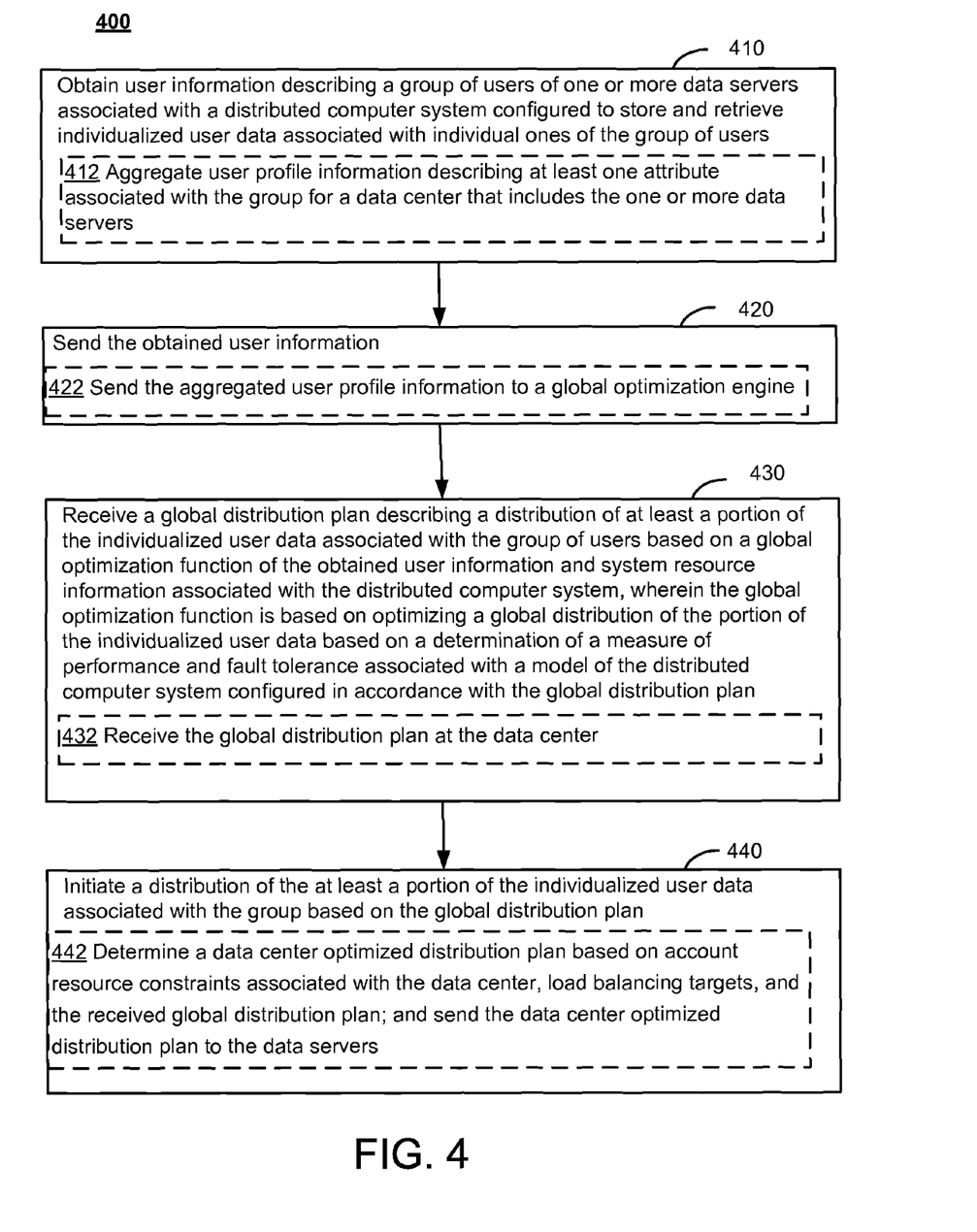
FIG. 4 is an example flow chart of a process for determining distribution plans.

Referring to FIG. 4, a process 400 for determining distribution plans is illustrated. Process 400 may include obtaining user information describing a group of users of one or more data servers associated with a distributed computer system configured to store and retrieve individualized user data associated with individual ones of the group of users (410). For example, the data center information collector 116 may be configured to obtain user information describing a group of users of one or more data servers associated with a distributed computer system configured to store and retrieve individualized user data associated with individual ones of the group of users (410).

In one example implementation, obtaining the user information may include aggregating user profile information describing at least one attribute associated with the group for a data center that includes the one or more data servers (412).

The obtained user information may be sent (420). For example, the obtained user information may be sent to a global optimization engine (422).

The aggregated user profile information may include a count of the users included in the group. The aggregated user profile information may include information describing at least one system resource usage attribute that indicates a usage attribute value that is similar for each user of the group. The system resource usage attribute may include a measure of usage of at least one system resource of the distributed computer system by each user included in the group. The system resource usage attribute may include a measure of an amount of individualized user data stored on at least one server of the distributed computer system that is similar for each user included in the group.

The user information may be stored in a memory of a device. For example, the user information may be stored in the user information memory 117 discussed above.

A global distribution plan may be received, describing a distribution of at least a portion of the individualized user data associated with the group of users based on a global optimization function of the obtained user information and system resource information associated with the distributed computer system, wherein the global optimization function is based on optimizing a global distribution of the portion of the individualized user data based on a determination of a measure of performance and fault tolerance associated with a model of the distributed computer system configured in accordance with the global distribution plan (430). For example, the global distribution plan may be received at the data center (432).

For example, the data center execution engine 120 may be configured to receive the global distribution plan from the global optimization engine 108, the global distribution plan describing a distribution of at least a portion of the individualized user data associated with the group of users based on an optimization function of the sent aggregated user profile information and system resource information associated with the distributed computer system.

A distribution of the at least a portion of the individualized user data associated with the group may be initiated based on the at least one global distribution plan (440). For example, the data center plan distributor 118 may be configured to initiate distribution of the at least a portion of the individualized user data associated with the group based on the at least one global distribution plan.

In an example implementation, the initiating may include determining a data center optimized distribution plan based on account resource constraints associated with the data center, load balancing targets, and the received global distribution plan, and sending the data center optimized distribution plan to the data servers (442).

Figure 5:
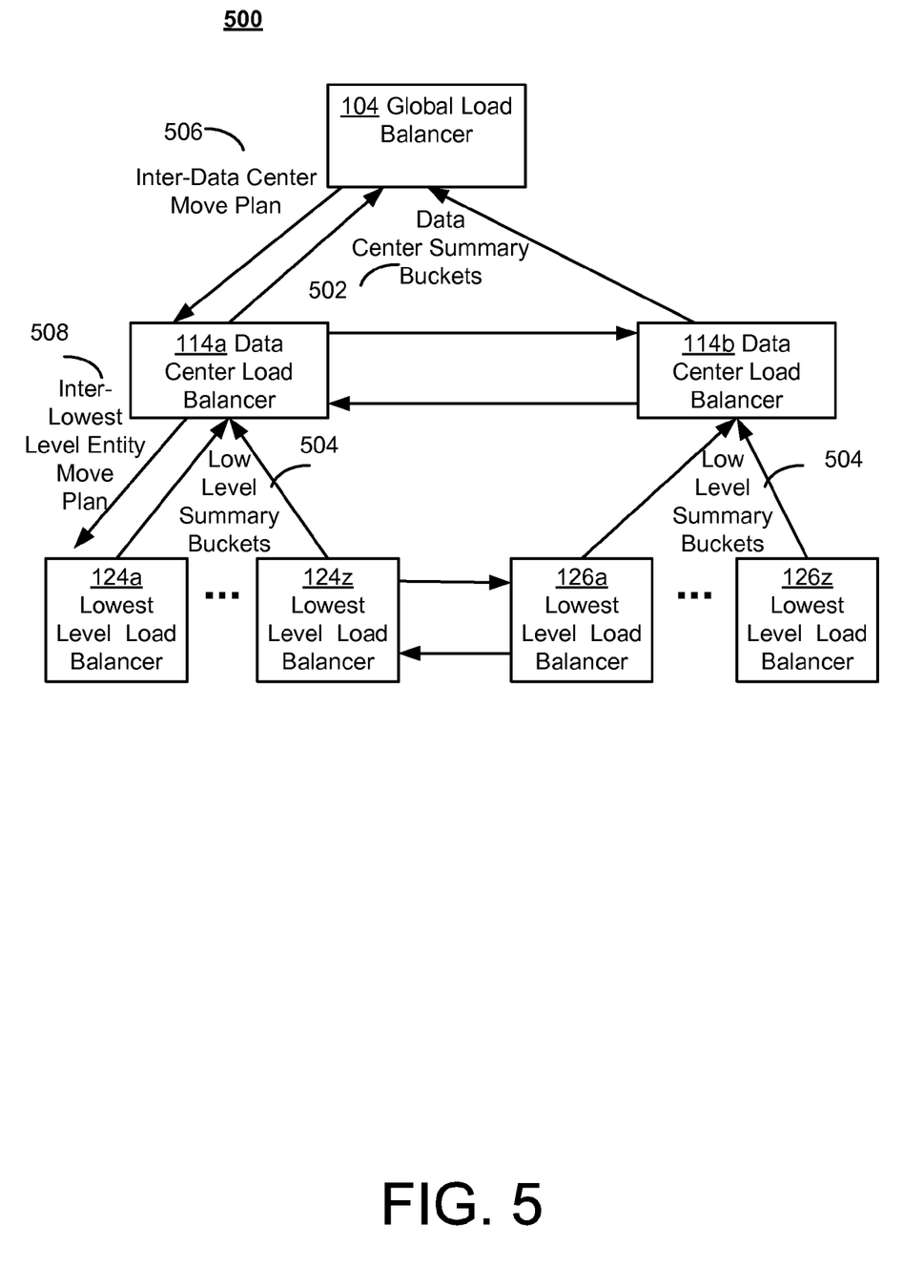
FIG. 5 is a block diagram of an example hierarchical user data load balancing system.

Referring to FIG. 5, a block diagram 500 of a hierarchical view of an example user data load balancing system is illustrated. In an example implementation, a bucket may encapsulate information of a particular type of users (e.g., "users owning approximately X bytes of individualized user data in the distributed computer system, where the users access their data from a preferred location, y, and storing master copies of their data in location Z," etc.). Buckets and the information they encapsulate may originate from the lowest level load balancers and may be passed upstream in the load balancer hierarchy as shown in FIG. 5.

In an example implementation, a definition of a bucket may be illustrated by the pseudocode-type representation below (where "//" indicates a beginning of explanatory comments):

```
message BucketDimension {
enum USER_TYPE {
MASTER=1;
BACKUP=2;
}
required USER_TYPE UserType=1;
enum USER_SIZE {
SMALL=17
MEDIUM=2;
LARGE=3;
HUGE=4;
}
required USER_SIZE UserSize=2;
enum USER_ACTIVITY {
LOW=1;
AVERAGE=2;
HIGH=3;
VERY_HIGH=4;
}
optional USER_ACTIVITY UserActivity=3;
required string location=4; // if master this is backup location
// if backup, this is master location
};
message Bucket {
required BucketDimension Dimension=1;
required int64 Count=2; // number of users in this bucket.
};
message BinMetadata {
required uint64 DiskCapacity=1;
required uint64 DiskFullness=2;
optional uint64 CurrentPlanId=3;
```

```
optional uint64 PercentMovesCompleted=4;
};
// Sent from child information collector to parent informa-
    tion collector
message Bin {
required string BinID=1; //lowest level name or data center
    name
repeated Bucket Buckets=2;
required BinMetadata Metadata=3;
};
```

As shown in the example above, the bucket may include a field for a user type, where for this example, a value of 1 indicates a "Master" type associated with the information encapsulated in the bucket for the users associated with the bucket, and a value of 2 indicates a "Backup" type. Further, the bucket may include a field for a user size, where for this example, a value of 1 indicates a "Small" size associated with the data associated with the users associated with the information encapsulated in the bucket, a value of 2 indicates an "Average" size, a value of 3 indicates a "Large" size, and a value of 4 indicates a "Huge" size associated with the data associated with the users associated with the information encapsulated in the bucket.

The bucket may further include a field for a user activity, where for this example, a value of 1 indicates a "Low" level of activity associated with the users associated with the information encapsulated in the bucket, a value of 2 indicates an "Average" level, a value of 3 indicates a "High" level, and a value of 4 indicates a "Very High" level of activity associated with the users associated with the information encapsulated in the bucket.

A "location" field may indicate a location of master copies of user data if the bucket is associated with backup copies of data, or it may indicate a location of backup copies of user data if the bucket is associated with master copies of data. Additional fields may indicate preferred locations associated with the user data, and required locations associated with the user data, as discussed above.

As discussed above, a "count" field may indicate a count of the number of users whose data is represented by the information included in the bucket. Thus, by sending this type of aggregated or summary information, distribution plans may be determined without a need to transmit user identifiers associated with every individual user of the distributed computer system.

Additional information fields may include a value indicating a disk capacity (e.g., a disk capacity associated with one or more lowest level entities), a current fullness of the disk resources (e.g., disk resources associated with one or more lowest level entities), a current plan identifier (e.g., an identifier associated with a most recent move plan that has been received for execution), and a value indicating a percentage of moves completed (e.g., moves associated with the most recent move plan). A message may also include information identifying the entity that is sending the aggregated information (e.g., an identifier associated with a lowest level entity or data center).

A move plan may be included in a distribution plan as discussed above, and may originate from a top level of the load balancing hierarchy, and may be propagated down to lower levels of the hierarchy. In an example implementation, a move plan may be illustrated by the pseudocode-type representation below:

```
message SingleMovePlan {
required string source=0; // can be a data center name, such
    as "P", "A" or a lowest level entity name such as "F-low-
    est.j"
required string destination=1; // can be a data center name,
    such as "P", "A" or a lowest level entity name such as
    "F-lowest.j"
repeated Bucket Buckets=2;
}
message MovePlan {
required uint64 PlanId=1;
repeated SingleMovePlan MovePlan=2;
}
```

As shown in this example, the move plan may include a value indicating a source location (e.g., a location from which the user data may be moved) and a destination location (e.g., a location to which the user data may be moved). In an example implementation, each move plan may be assigned a unique identification number, e.g., a "PlanID." In an example implementation, a move plan may be generated by the global load balancer 104 periodically, and lowest level load balancers 124, 128, 128 (e.g., as shown in FIG. 1) may discard an older move plan when a newer move plan arrives (recognized, for example, by having a higher PlanID number than the PlanID number of the older move plan).

In an example implementation, an optimizing load balancing technique may include example steps such as described below:

In a first example step, the global load balancer 104 may be triggered by a timer or a predetermined type of status change in any lower level entity.

In a second example step, the global load balancer 104 may obtain user profile information included in aggregated bucket information statistics 502 from the data center load balancers 114a, 114b (e.g., which in turn may obtain aggregated user profile information from the lowest level load balancers 124a, ..., 126z via lowest level summary buckets 504), and may balance them by generating a global inter-data center move plan (e.g., a global distribution plan) 506. In an example implementation, the global load balancer 104 may load-balance various data centers 202a, 202b by performing one or more of the following substeps. For example, a number of master and backup accounts can be evenly distributed. Masters and backup accounts can be evenly distributed based on their respective sizes (e.g., according to size indicators that may include aggregated values of small, medium, large, and extra large). Data owned by a predetermined number of users may be moved to the preferred locations of the users. Individualized user data of users that is not currently located at the users' required locations may be moved to their required locations.

Capacity may be balanced across all data centers (e.g., to ensure that no data center's used capacity is above a high watermark threshold and to ensure that variances between the used capacity of the data centers is below a predetermined threshold). A placement of masters and backups of any single user may be controlled so that masters and backups of the same user are not placed in the same data center. The total number of moves made may be minimized. The total distances of the users moved may be minimized. The total number of moves made may be controlled to ensure that the number is below a predetermined maximum.

In an example implementation, an output of this balancing step (i.e., the second example step referenced above) may include a move plan that redresses imbalances in the data centers. In an example implementation, the output move plan may be visualized as a two dimensional matrix, wherein the rows may depict source data centers and the columns may depict destination data centers of the move plan (e.g., the global distribution plan). In an example implementation, cells of the matrix may include a list of buckets and their respective counts to be moved from the source data center to the destination data center.

An example move plan may include:

{PlanId=42, source="P"; destination="W"; vector <Buckets, counts>}

As shown in the above example move plan, the source "P" may indicate a source data center or lowest level entity from which user data is to be moved, and the destination "W" may indicate a destination data center or lowest level entity to which user data is to be moved, in accordance with information included in the indicated buckets.

In a third example step, the global load balancer 104 may send the move plan (e.g., the global distribution plan) 506 to the data center load balancers 114a, 114b.

In a fourth example step, the data center load balancers 114a, 114b may load balance their lowest level entities, and may also the use global distribution plan to determine a move plan 508 for each data center 202a, 202b (e.g., this loadbalancing step may be similar to step 1, except that preferred and required locations may not be handled). This data center move plan may be complete for moves within a particular data center 202a, 202b, for example a complete plan may be illustrated as:

{source="P-lowest.a"; destination="P-lowest.c"; vector <Buckets, counts>}

(e.g., indicating specific entity-to-entity moves within the same data center), but may be incomplete for moves outside and into the data center 202a, 202b. For example, an incomplete plan may be illustrated as:

{source="P-lowest.a"; destination="W"; vector <Buckets, counts>}

(e.g., indicating a move from an entity within the same data center to an entity in another data center). In the move plan shown above, the example destination entities in "W" may be unknown.

In a fifth example step, the data center load balancers 114a, 114b may send their partial inter-data center move plans (e.g., the data center distribution plan) to a matcher for matching of the source and destination information.

In a sixth example step, the matcher may determine complete move plans for pairs of data centers based on the partial move plans sent from the data centers.

For example, a pair of inputs to the matching operation may be represented (e.g., via a pseudo-code type representation) as a first input as shown below:

{
PlanId=42
{source="P-lowest.a"; destination="W"; vector <Buckets, counts>}
// assume 5000 users
{source="P-lowest.b"; destination="W"; vector <Buckets, counts>}
// assume 5000 users}
} and a second input as shown below:

{
PlanId=42
{source="P"; destination="W-lowest.i"; vector <Buckets, counts>}
// assume 3000 users
{source="P"; destination="W-lowest.j"; vector <Buckets, counts>}
// assume 3000 users
{source="P"; destination="W-lowest.k"; vector <Buckets, counts>}
// assume 4000 users
}

Based on these example inputs, matches may be determined for the 10,000 users associated with buckets from the source lowest level entities "P-lowest.a" and "P-lowest.b" (e.g., located within the same data center) to the destination lowest level entities "W-lowest.i", "W-lowest.j" and "W-lowest.k" (e.g., located together in a different data center).

In an example implementation, the output of the matching engine may thus include a complete entity-to-entity move plan, as shown below:

{
Planid=42
{source="P-lowest.a"; destination="W-lowest.i"; vector <Buckets, counts>} //3000 users
{source="P-lowest.a"; destination="W-lowest.j"; vector <Buckets, counts>} //2000 users
{source="P-lowest.b"; destination="W-lowest.j"; vector <Buckets, counts>} //2000 users
{source="P-lowest.b"; destination="W-lowest.k"; vector <Buckets, counts>} //3000 users)
}

Thus, the move plan may indicate that individualized user data of 3000 users (e.g., as identified by the buckets information) will be moved from source lowest level entity "P-lowest.a" to destination lowest level entity "W-lowest.i", that individualized user data of 2000 users will be moved from source lowest level entity "P-lowest.a" to destination lowest level entity "W-lowest.j", that individualized user data of 2000 users will be moved from source lowest level entity "P-lowest.b" to destination lowest level entity "W-lowest.j", and that individualized user data of 3000 users will be moved from source lowest level entity "P-lowest.b" to destination lowest level entity "W-lowest.k". In an example implementation, these consolidated move plans may be provided to the data center load balancers 114a, 114b.

In a seventh example step, the data center load balancers 114a, 114b may send these completed move plans (e.g., via the plan distributor 118) to the respective source lowest level entity load balancers 124a, ..., 124z, 126a, ..., 126z.

For example, the data center load balancer 114a may send the following example move plan, at least, to an entity identified as "P-lowest.c", to instruct the entity with regard to the movement of user data to other entities (e.g., entities "W-lowest.i", "R-lowest.j", "G-lowest.x", "H-lowest.a"):

{
Planid=42
{source="P-lowest.c"; destination="W-lowest.i"; vector <Buckets, counts>}
{source="P-lowest.c"; destination="R-lowest.j"; vector <Buckets, counts>}
{source="P-lowest.c"; destination="G-lowest.x"; vector <Buckets, counts>}
{source="P-lowest.c"; destination="H-lowest.a"; vector <Buckets, counts>}
}

In an eighth example step, in a loop, the lowest level load balancers 124a, ..., 124z, 126a, ..., 126z may perform the following substeps (e.g., in a rate-controlled manner).

The source lowest level load balancers 124a, ..., 124z, 126a, ..., 126z may receive the new move plans and discard the older move plans immediately.

A next move may be selected, for example, from a queue of indicators of moves. The source and destination lowest level load balancers may then coordinate the movement of the user data in accordance with the move plans.

One or more of example substeps as discussed above may be repeated until a new move plan arrives.

In an example implementation, a Linear Programming (LP) based solver may be used for a load balancing algorithm in the global load balancer 104 and the data center load balancers 114a, 114b, as LP solutions may determine a best outcome (such as maximum profit or lowest cost), given a list of requirements that may be represented as linear equations. In an example implementation, the LP based approach may simplify the load balancing algorithm, while simultaneously providing more power for the distributed computer system.

In an example implementation, a linear programming (LP) problem may be modeled as costs and constraints. Example constraints for an example user data distributed system may include one or more of the following: (a) masters and backups may not reside in the same data center; (b) no lowest level entity may be above a predetermined high watermark; (c) users may not be moved out of their required locations (e.g., if U.S. location is a requirement of a particular user agreement); (d) example costs which may be maximized or minimized may include maximizing users in preferred locations, minimizing a total number of moves, and minimizing a total distance of users that are to be moved.

The example techniques discussed herein may provide desirable placement of user data for example organizations that may include many data centers and may store individualized user data or information (e.g., by improving performance and decreasing cost). In an example implementation, these example techniques may be used by a "large" email service that includes distributed data centers. In an example implementation, these example techniques may be used example services such as personal calendar services, digital photo services or other personalized user data storage systems, or social networking systems.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or computer-readable storage medium, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors (e.g., instruction processor 103) executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network (e.g., network 204). Examples of communication networks include a local area network (LAN) and a wide area network (WAN), e.g., the Internet. Connections to a network may be accomplished, for example, via a network interface card coupled to a device.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method comprising:
   obtaining, by a processor, information describing a geographic area from which users of a distributed computer system request access to individualized user data associated with individual ones of the users;
   determining a global move plan indicating a plan of movement of individualized user data associated with selected users between different locations based on:
   a global optimization function of the individualized user data;
   a current geographic distribution of the selected users; and
   a cost associated with the movement of the user data;
   wherein the global optimization function includes moving the individualized user data to data centers geographically proximate to the geographic area; and
   providing the determined global move plan to a load balancer for processing of the global move plan.

2. The computer-implemented method of claim 1 wherein the providing includes sending the global move plan to a data center load balancer.

3. The computer-implemented method of claim 1, further comprising aggregating the users into a group based on the users requesting access to their respective individualized user data from the geographic area.

4. The computer-implemented method of claim 3 further comprising aggregating user profile information including a count of the users included in the group.

5. The computer-implemented method of claim 4 wherein the aggregated user profile information further includes information describing a system resource usage attribute that indicates a usage attribute value that is similar for each user of the group.

6. The computer-implemented method of claim 5 wherein the system resource usage attribute includes a measure of usage of a system resource of the distributed computer system associated with each user included in the group.

7. The computer-implemented method of claim 5 wherein the system resource usage attribute includes a measure of an amount of individualized user data stored on one or more servers of the distributed computer system, wherein the measure of the amount of stored individualized user data is associated with each user included in the group.

8. The computer-implemented method of claim 1 further comprising obtaining system resource information associated with the distributed computer system including information indicating at least one of processor capacity, processor usage, storage device capacity, storage device usage, geographic location of distributed network devices, network bandwidth, or network latency.

9. The computer-implemented method of claim 1 wherein the distributed computer system includes a distributed computer system configured to provide at least one of email operations, calendar operations, or distributed storage operations for the users.

10. The computer-implemented method of claim 1 wherein the distributed computer system includes a master copy of individualized user data stored on a first server and a backup copy of the individualized user data stored on a second server associated with each of the users.

11. The computer-implemented method of claim 1 wherein the information includes aggregated user profile information describing at least the geographic area from which the users request access, and the global move plan includes aggregated user profile information and one or more counts associated with users selected for movement of data.

12. The computer-implemented method of claim 1 wherein determining the global move plan includes executing a constraint optimization operation on the obtained information and system resource information associated with the distributed computer system, to generate the global move plan.

13. The computer-implemented method of claim 12 wherein the constraint optimization operation is based on linear programming.

14. The computer-implemented method of claim 1, further comprising aggregating the users into a group based on the users in the group requesting access to their respective individualized user data from the geographic area and based on the users in the group using similar amounts of storage space for their data.

15. A system comprising:
at least one instruction store configured to store machine-executable instructions;
at least one instruction processor configured to execute at least a portion of the machine-executable instructions stored in the at least one instruction store to implement a global load balancer,
the global load balancer including:
a global execution engine configured to obtain information describing a geographic area from which users of a distributed computer system request access to individualized user data associated with individual ones of the users; and
a global optimization engine configured to determine a global move plan indicating a plan of movement of the individualized user data associated with selected users between different locations based on:
a global optimization function of the individualized user data;
a current geographic distribution of the selected users; and
a cost associated with the movement of the user data;
wherein the global optimization function includes moving the individualized user data to data centers geographically proximate to the geographical area.

16. The system of claim 15 wherein the global optimization engine is configured to provide the determined global move plan to a device based on sending the global move plan to a data center load balancer.

17. The system of claim 15 wherein the global execution engine is further configured to aggregate the users into a group based on the users requesting access to their respective individualized user data from the geographic area.

18. The system of claim 17 wherein the information further includes a count of the users included in the group.

19. The system of claim 17 wherein the information further includes information describing a system resource usage attribute that indicates a usage attribute value that is similar for each user of the group.

20. The system of claim 15 wherein the global optimization engine is configured to determine the global move plan based on executing a constraint optimization operation on the obtained information and system resource information associated with the distributed computer system, to generate the global move plan.

21. The system of claim 20 wherein the constraint optimization operation is based on linear programming.

22. The system of claim 15, wherein the global optimization engine is further configured to aggregate the users into a group based on the users in the group requesting access to their respective individualized user data from the geographic area and based on the users in the group using similar amounts of storage space for their data.

* * * * *